(12) United States Patent
Feng

(10) Patent No.: US 10,454,196 B2
(45) Date of Patent: Oct. 22, 2019

(54) CAGE-TYPE HYPERBOLIC SPRING STRUCTURE AND SOCKET

(71) Applicant: Jibing Feng, Guangdong (CN)

(72) Inventor: Jibing Feng, Guangdong (CN)

( * ) Notice: Subject to any disclaimer, the term of this patent is extended or adjusted under 35 U.S.C. 154(b) by 0 days.

(21) Appl. No.: 15/485,709

(22) Filed: Apr. 12, 2017

(65) Prior Publication Data

US 2018/0138623 A1 May 17, 2018

(30) Foreign Application Priority Data

Nov. 16, 2016 (CN) .......................... 2016 1 1021731

(51) Int. Cl.
| | | |
|---|---|---|
| *H01R 13/187* | (2006.01) | |
| *H01R 13/24* | (2006.01) | |
| *F16F 1/02* | (2006.01) | |
| *F16F 1/04* | (2006.01) | |
| *H01R 24/58* | (2011.01) | |
| *H01R 103/00* | (2006.01) | |
| *H01R 101/00* | (2006.01) | |

(52) U.S. Cl.
CPC ......... *H01R 13/2407* (2013.01); *F16F 1/025* (2013.01); *F16F 1/045* (2013.01); *H01R 13/187* (2013.01); *H01R 24/58* (2013.01); *F16F 2224/02* (2013.01); *F16F 2226/048* (2013.01); *H01R 2101/00* (2013.01); *H01R 2103/00* (2013.01)

(58) Field of Classification Search
CPC .... H01R 13/18; H01R 13/187; H01R 23/727; H01R 13/20; H01R 13/15; H01R 13/111
USPC .................................. 439/839, 843–847, 851
See application file for complete search history.

(56) References Cited

U.S. PATENT DOCUMENTS

| | | | | |
|---|---|---|---|---|
| 1,867,723 A | * | 7/1932 | Adams | D06F 83/00 267/135 |
| 4,720,157 A | * | 1/1988 | Nestor | H01R 13/187 439/843 |
| 4,907,788 A | * | 3/1990 | Balsells | F16F 1/04 267/1.5 |
| 5,137,013 A | * | 8/1992 | Chiba | A61B 17/29 604/524 |
| 5,591,039 A | * | 1/1997 | Matthews | H01R 13/53 439/181 |
| 5,667,413 A | * | 9/1997 | Trafton | H01R 13/187 439/271 |

(Continued)

*Primary Examiner* — Thanh Tam T Le
(74) *Attorney, Agent, or Firm* — Yue (Robert) Xu; Apex Attorneys at Law, LLP

(57) ABSTRACT

A cage-type hyperbolic spring structure and a socket are provided. The cage-type hyperbolic spring structure is applied in a jack terminal. The cage-type hyperbolic spring includes multiple copper hyperbolic columnar canted springs and a machined body. The multiple copper hyperbolic columnar canted springs are annularly wound into a closed cylindrical annular structure by laser spot welding or a thin hollow tube, the cylindrical annular spring structure is inserted into the machined body, and then a inclined riveting necked port at an end of a thin-walled tube ensures the cylindrical inclined spring not to fall off during plugging and unplugging of the male terminal and the female terminal, it may also employ an assembling method to install an elastic C-ring to press the end of the thin-walled tube tightly.

8 Claims, 4 Drawing Sheets

(56) References Cited

U.S. PATENT DOCUMENTS

| | | | | |
|---|---|---|---|---|
| 5,791,638 A * | 8/1998 | Balsells | .................... | F16F 3/04 267/167 |
| 5,807,146 A * | 9/1998 | Baker | .................... | H01R 13/17 439/827 |
| 6,042,432 A * | 3/2000 | Hashizawa | .......... | H01R 13/187 439/843 |
| 6,102,746 A * | 8/2000 | Nania | .................... | H01R 13/11 439/675 |
| 6,254,439 B1 * | 7/2001 | Endo | .................... | H01R 13/187 439/843 |
| 6,520,998 B1 * | 2/2003 | Scholler | ............... | H01R 13/187 439/843 |
| 6,848,922 B2 * | 2/2005 | Coughlan | .............. | H01R 13/53 439/181 |
| 7,274,964 B2 * | 9/2007 | Balsells | ............... | A61N 1/3752 267/166 |
| 7,805,838 B2 * | 10/2010 | Morana | ................ | H01R 13/187 29/868 |
| 7,828,609 B2 * | 11/2010 | Li | ........................ | H01R 13/187 29/862 |
| 7,857,671 B2 * | 12/2010 | Carboni | ............... | H01R 13/187 324/756.04 |
| 8,282,429 B2 * | 10/2012 | Glick | ................... | H01R 13/187 439/843 |
| 8,678,867 B2 * | 3/2014 | Glick | ................... | H01R 13/187 439/843 |
| 8,959,763 B2 * | 2/2015 | Wu | ...................... | H01R 13/187 29/876 |
| 9,010,740 B2 * | 4/2015 | Jaster | ..................... | F16F 1/045 267/1.5 |
| 9,182,000 B2 * | 11/2015 | Harms | ..................... | A61M 5/20 |
| 9,484,641 B2 * | 11/2016 | Ohkubo | ............... | H01R 13/187 |
| 9,484,644 B2 * | 11/2016 | Ohkubo | ............... | H01R 13/04 |
| 2009/0301510 A1 * | 12/2009 | Hsu | ......................... | A45D 8/00 132/273 |
| 2013/0149031 A1 * | 6/2013 | Changsrivong | ......... | F16B 17/00 403/376 |
| 2016/0076568 A1 * | 3/2016 | Dilmaghanian | ... | H01R 13/2421 403/271 |

* cited by examiner

CAGE-TYPE HYPERBOLIC SPRING STRUCTURE AND SOCKET

CROSS-REFERENCE TO RELATED APPLICATIONS

The present application claims the benefit of priority to Chinese patent application No. 201611021731.X titled "CAGE-TYPE HYPERBOLIC SPRING STRUCTURE AND SOCKET", filed with the Chinese State Intellectual Property Office on Nov. 16, 2016, the entire disclosure of which is incorporated herein by reference.

FIELD

This application relates to the technical field of sockets, and particularly to a cage-type hyperbolic spring structure and a socket.

BACKGROUND

Currently, with the development of the electric vehicle industry, higher requirements are imposed on a jack due to the using of a large current, for example, a low plugging and unplugging force for meeting people's frequent plugging and unplugging requirement in charging; a low contact resistance for alleviating the temperature rising issue caused by the large current.

A conventional electric connector contact member includes a single sheet revolving hyperbolic wire spring jack, which utilizes a group of elastic wires arranged into a single sheet revolving hyperbolic structure to evenly wrap around a surface of a pin inserted therein, belonging to a multiple wire wrapping contact. The jack contact adopting this wire spring structure consists of four parts including an inner sleeve, an outer sleeve, a rear sleeve and elastic wires. A group of elastic wires arranged into a single sheet revolving hyperbolic structure are coaxially nested in an inner sleeve tube, and two ends of the wires mounted in the inner sleeve tube protrude out of openings at two ends of the inner sleeve tube, and curve backwards on an outer cylindrical surface of the inner sleeve tube. A curved portion is clamped by inner cylindrical surfaces of a front sleeve and the rear sleeve and the outer cylindrical surface of the inner sleeve. The front sleeve and the rear sleeve are connected integrally into an outer sleeve by being pressed.

The wire spring jack has following deficiencies.

1. With the sleeve connection, the contact resistance is large, and a pulling resistance is poor, and the front and rear sleeve are extremely apt to be disengaged from the pressing point due to a pulling force, causing connecting fault and incident. 2. The structure is complex, the number of parts to be assembled is large and the volume cannot be further reduced, which is disadvantageous for the development of miniaturization and densification. 3. The manufacturing process is complex; the precision requirement is high, causing a low product qualification rate and an improved cost. 4. The elastic wires cannot be arranged to be thick in a limited space, and each wire cannot withstand a large current surge. 5. The phenomena of breaking of the elastic wires is unavoidable during use. 6. The plugging and unplugging force is large. Since the copper wires are fixed to two ends of a thin-walled tube and are immovable, a large plugging and unplugging force is therefore required.

SUMMARY

A cage-type hyperbolic spring structure and a socket are provided according to the embodiments of the present application, which ensures a stable contact under a large current, and thus improves the service life of the product, and simplifies the structure, and facilitates miniaturization of the product.

In a first aspect, the cage-type hyperbolic spring structure for applying in a jack terminal is provided. The cage-type hyperbolic spring structure includes multiple copper hyperbolic columnar canted springs and a machined body. The multiple copper hyperbolic columnar canted springs are annularly wound into a closed cylindrical annular structure by laser spot welding or a thin hollow tube. The machined body is in a circular tubular shape. The cylindrical annular structure is inserted into the machined body and closely fits the machined body. A pressing structure configured to press the cylindrical annular structure and the machined body tightly is provided at an end of the machined body.

Optionally, a thin copper sheet configured to support the hyperbolic columnar canted spring is inserted into the cylindrical annular structure, and the thin copper sheet may have a thickness ranging from 0.2 mm to 10 mm.

Optionally, spring wires of the hyperbolic columnar canted springs at two ends of a columnar part form an included angle ranging from 0 degree to 90 degrees in a radial direction.

Optionally, in the hyperbolic columnar canted spring, each of an inner ring spring and an outer ring spring forms an included angle ranging from 0 degree to 20 degrees with respect to an axial direction.

Optionally, in the hyperbolic columnar canted spring, each of an inner ring and an outer spring is in parallel with an axial direction.

Optionally, in the hyperbolic columnar canted spring, an outer ring spring is in parallel with an axial direction, and an inner ring spring forms an included angle ranging from 0 degree to 20 degrees with respect to the axial direction.

Optionally, in the hyperbolic columnar canted spring, each spring copper wire has a diameter ranging from 0.05 mm to 10 mm.

Optionally, the pressing structure is an inclined riveting necked port or an elastic C-ring.

Optionally, the machined body has a wall thickness ranging from 0.5 mm to 5 mm.

In a second aspect, a socket is provided, which includes at least a jack. A cage-type hyperbolic spring structure is equipped in the jack, and the cage-type hyperbolic spring structure is any one of the cage-type hyperbolic spring structures according to the first aspect.

It can be seen from the above technical solutions that, the embodiments of the present application has the following advantages:

In the embodiments of the present application, the deformation of the male terminal caused by being radially compressed when the male terminal is inserted into the jack comes from a combined effect of a radial deformation and a normal elastic deformation, which may ensure a positive pressure being applied during the plugging of the male terminal and the female terminal, and ensure a stable contact between the male terminal and the female terminal in the case of a large current. Each copper wire generates elastic deformation rather than plastic deformation during being compressed, which improves service life of the product, and postpones the time of degradation of the spring. In the process of cooperation of the male terminal and female terminal, the hyperbolic spring has a diameter at an axial middle part smaller than diameters at the two ends due to being inclined, thus forming a wrapping structure in the case that the male terminal is plugged in, thereby forming a large number of contact points on each copper wire, in this way, the structure may have a low contact impedance when a super large current passes there through. Furthermore, the multiple hyperbolic columnar canted springs of the hyperbolic spring structure may overlap with each other when being compressed, thereby reducing the space occupied by elastic deformation of the springs, and thereby ensuring a small volume of the spring structure.

DETAILED DESCRIPTION

For making the person skilled in the art better understand the solution of the present application, the technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 1:
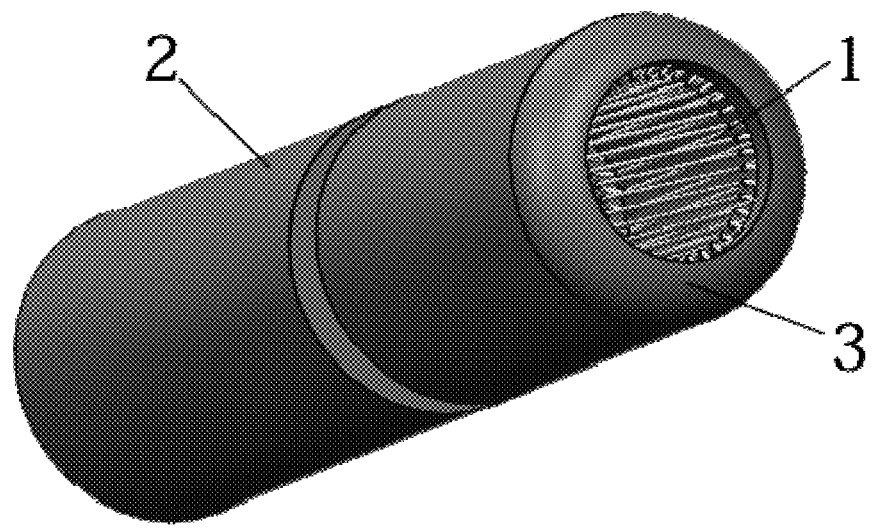
FIG. 1 is a schematic view showing an embodiment of a hyperbolic columnar canted spring according to embodiments of the present application.
Figure 2:
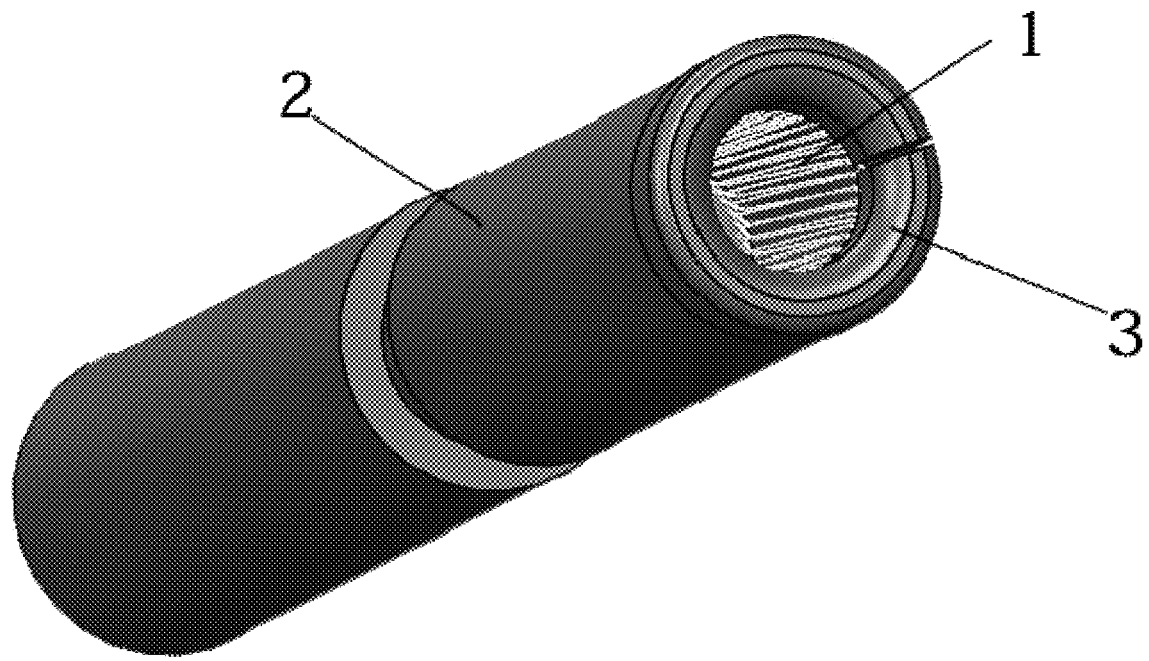
FIG. 2 is a schematic view showing another embodiment of the hyperbolic columnar canted spring according to the embodiments of the present application.
Figure 6:
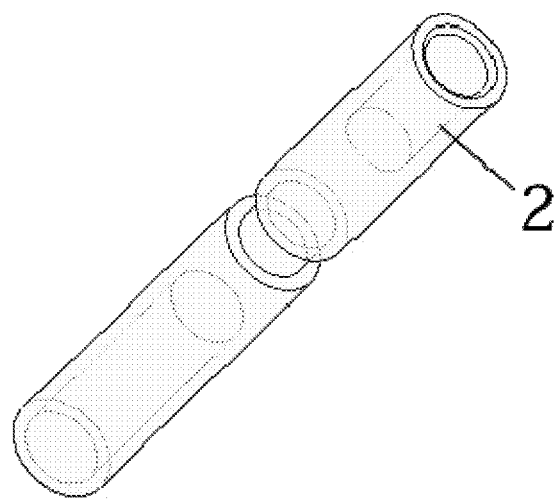
FIG. 6 is a schematic view showing an embodiment of the structure of a machined body according to the embodiments of the present application.

A cage-type hyperbolic spring structure is provided according to an embodiment of the present application, as shown in FIGS. 1 and 2, which is applied in a jack terminal. The cage-type hyperbolic spring structure includes a closed cylindrical annular structure 1 and a machined body 2. Multiple copper hyperbolic springs are annularly wound into the closed cylindrical annular structure 1 by laser spot welding or a thin hollow tube. The cylindrical annular structure is inserted into the machined body and closely fits the machined body 2. A pressing structure 3 is provided at an end of the machined body 2 for pressing the cylindrical annular structure and the machined body 2 tightly, as in FIG. 6 which shows a schematic view of an embodiment of the structure of the machined body 2.

Optionally, a thin copper sheet configured to support the hyperbolic columnar canted spring is inserted into the cylindrical annular structure, and the thin copper sheet may have a thickness ranging from 0.2 mm to 10 mm.

Optionally, spring wires of the hyperbolic columnar canted springs at two ends of a columnar part form an included angle ranging from 0 degree to 90 degrees in a radial direction.

Figure 3:
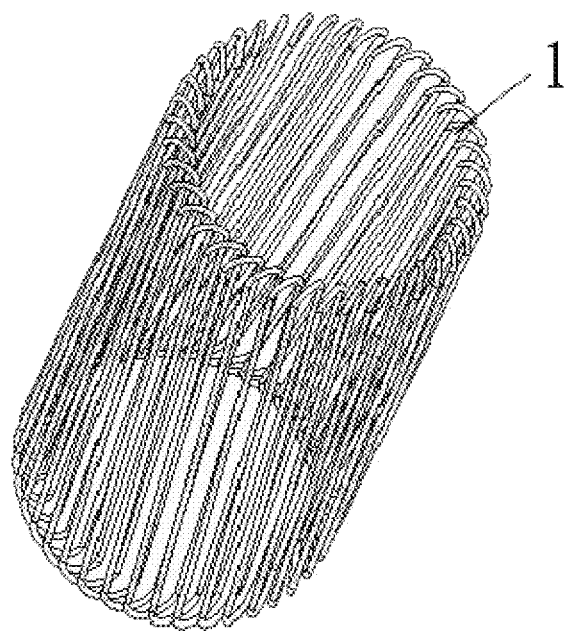
FIG. 3 is a schematic view showing the structure of the hyperbolic columnar canted spring, in which each of an inner ring spring and an outer ring spring forms an included angle with respect to an axial direction.

Optionally, as shown in FIG. 3, in the hyperbolic columnar canted spring, each of an inner ring spring and an outer ring spring forms an included angle ranging from 0 degree to 20 degrees with respect to an axial direction.

Figure 4:
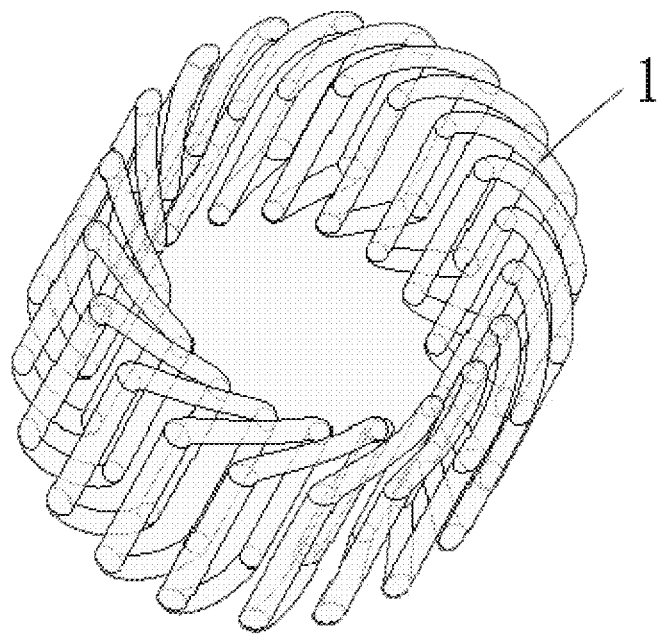
FIG. 4 is a schematic view showing another structure of the hyperbolic columnar canted spring, in which each of the inner ring spring and the outer ring spring is in parallel with respect to the axial direction.

Optionally, as shown in FIG. 4, in the hyperbolic columnar canted spring, each of an inner ring spring and an outer ring spring is in parallel with an axial direction.

Figure 5:
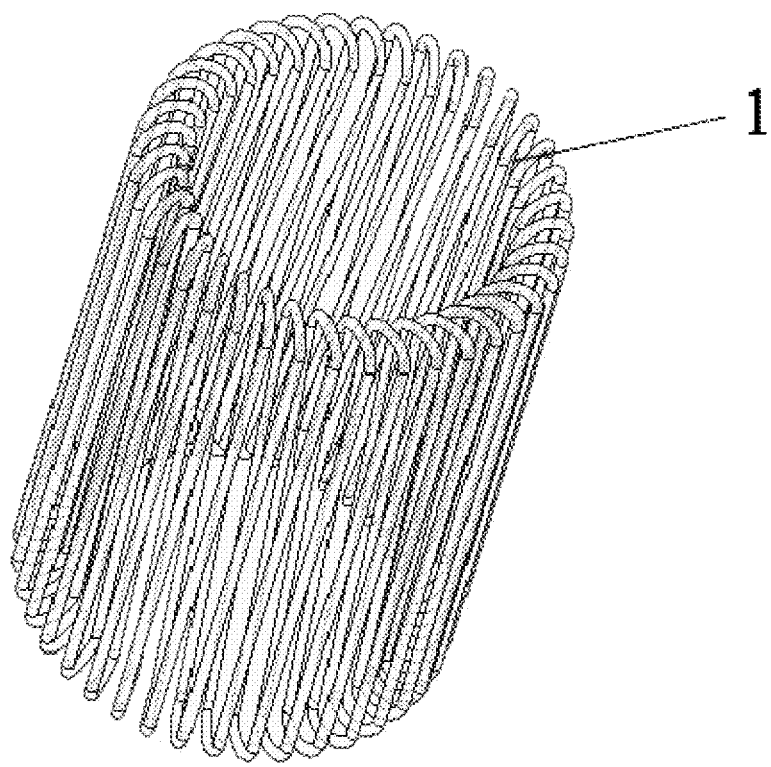
FIG. 5 is a schematic view showing another structure of the hyperbolic columnar canted spring, in which the outer ring spring is in parallel with the axial direction, and the inner ring spring forms an included angle with respect to the axial direction.

Optionally, as shown in FIG. 5, in the hyperbolic columnar canted spring, the outer ring spring is in parallel with an axial direction, and the inner ring spring forms an included angle ranging from 0 degree to 20 degrees with respect to the axial direction.

Optionally, the hyperbolic columnar canted spring is in a "U" shape in the radial direction.

Optionally, in the hyperbolic columnar canted spring, each copper wire has a diameter ranging from 0.05 mm to 10 mm.

Figure 7:
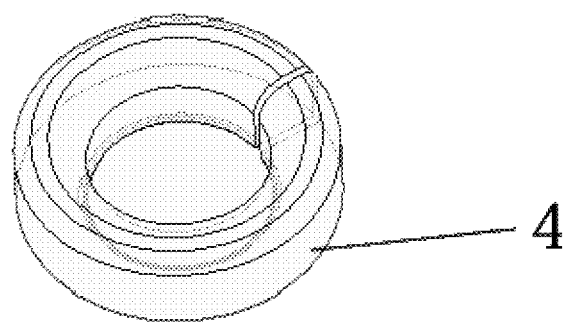
FIG. 7 is a schematic view showing an embodiment of the structure of an elastic C-ring according to the embodiments of the present application.

Optionally, as shown in FIG. 1, the pressing structure 3 is an inclined riveting necked port, as shown in FIG. 2, the pressing structure 3 is an elastic C-ring for pressing the cylindrical annular structure and the machined body tightly, as in FIG. 7 which is a schematic view showing the structure of the elastic C-ring.

In the present application, copper wires are employed as a raw material (with a diameter ranging from 0.05 mm to 10 mm), and are formed into the following two kinds of springs, namely, a hyperbolic inclined spring and a hyperbolic straight spring, by being shaped with a spring machine, and then are annularly wound into a closed cylindrical annular structure by an assembling method or by a laser spot welding method. In the assembling method, two ends of the thin copper wires are respectively inserted into a common machined body, and then are riveted together to form a closed loop. In the laser spot welding method, the two ends of the copper wires are fused and sintered together by current which is generated by positive and negative electrodes. In the process of forming the annular closed loop, a thin copper sheet may be inserted into the spring to function as a liner for supporting the annular spring if the copper wires are too thin, which depends on the size of the diameter of the spring wires.

The hyperbolic inclined spring according to the embodiments of the present application has the following advantages.

Firstly, since a inclined structure is employed, male and female terminals form a perfect winding structure when in a plugged state, which allows each copper wire to completely fit a surface of the male terminal, and further, the copper wires wrap the surface of the male terminal densely, and this dense line contact method greatly improves current passing capability; further, due to the hyperbolic characters, it not only ensures a stable contact of the male terminal with the spring in a plugged state, but also ensures a stable contact of the spring in a state of being assembled into the machined terminal.

Secondly, an included angle between each copper wire and the radial direction enables each copper wire to generate an elastic deformation rather than a plastic deformation in a compressed process, which improves service life of the product, and postpones the time of degradation of the spring.

Thirdly, since the contact area is deformed elastically, a plugging force may maintain a stable positive pressure even if it is very small, which realizes a stable contact by a very small plugging force, and by nearly a zero force, therefore, it can be called a solution of "zero plugging force".

Fourthly, due to an included angle between a plane formed by each wire and the radial direction, it may ensure that the springs may overlap with each other during being compressed, which may reduce the space occupied by the elastic deformation of the springs, and therefore may ensure a small volume of the spring structure.

The advantages of using the hyperbolic straight spring are as follows.

The deformation of the spring for being compressed radially comes from a combined effect of "a radial U shaped deformation" and an elastic normal deformation, which may ensure a positive pressure being applied during the plugging of the male terminal and the female terminal, and ensure a stable contact between the male terminal and the female terminal under a large current. Other advantages of the hyperbolic straight spring are similar to those of the hyperbolic inclined spring.

A socket is further provided according to an embodiment of the present application, the socket includes at least one jack, as shown in FIG. 4, a cage-type hyperbolic spring structure is equipped in the jack, and the cage-type hyperbolic spring structure is any one of the cage-type hyperbolic spring structures according to the first aspect.

The person skilled in the art may clearly know that, for the ease and brevity of the description, in the above embodiments, the descriptions of the embodiments focus on different aspects, a part which is not described in detail in a certain embodiment may refer to relevant description of other embodiments.

The above embodiments are just used for illustrating the technical solution and not for limitation. Although the present application is described in detail with reference to the aforementioned embodiments, it should be understood by the person skilled in the art that the technical solutions described in each of the embodiments can be modified, or some of the technical features can be replaced equivalently. Such modification and replacement do not make the nature of the corresponding technical solution depart from the spirit and scope of technical solution of each of the embodiments of the present application.

The invention claimed is:

1. A cage-type hyperbolic spring structure for being applied in a jack terminal, comprising:
a plurality of elongated annular springs; and
a machined body,
wherein each one of the plurality of elongated annular springs comprises an inner ring spring and an outer ring spring, both the inner ring spring and the outer ring spring are in a shape of straight line, the plurality of elongated annular springs are annularly wound into a closed cylindrical annular structure by laser spot welding, and the inner ring spring is closer to an axial line of the cylindrical annular structure than the outer ring spring;
the machined body is in a circular tubular shape, and the cylindrical annular structure is inserted into the machined body and closely fits the machined body; and
a pressing structure configured to press the cylindrical annular structure and the machined body tightly is provided at an end of the machined body;
wherein each end of elongated annular spring forms an included angle being larger than 0 degree and not larger than 90 degrees with respect to a radial direction; and
wherein the outer ring spring is in parallel with an axial direction, and the inner ring spring forms an included angle being larger than 0 degree and not larger than 20 degrees with respect to an axial direction.

2. The spring structure according to claim 1, wherein in the elongated annular spring, each copper wire has a diameter ranging from 0.05 mm to 10 mm.

3. A socket, comprising:
at least one jack,
wherein the spring structure according to claim 2 is equipped in the jack.

4. The spring structure according to claim 1, wherein the pressing structure is an inclined riveting necked port or an elastic C-ring.

5. A socket, comprising:
at least one jack,
wherein the spring structure according to claim 4 is equipped in the jack.

6. The spring structure according to claim 1, wherein the machined body has a wall thickness ranging from 0.5 mm to 5 mm.

7. A socket, comprising:
at least one jack,
wherein the spring structure according to claim 6 is equipped in the jack.

8. A socket, comprising:
at least one jack,
wherein the spring structure according to claim 1 is equipped in the jack.

* * * * *